United States Patent Office 2,880,834
Patented Apr. 7, 1959

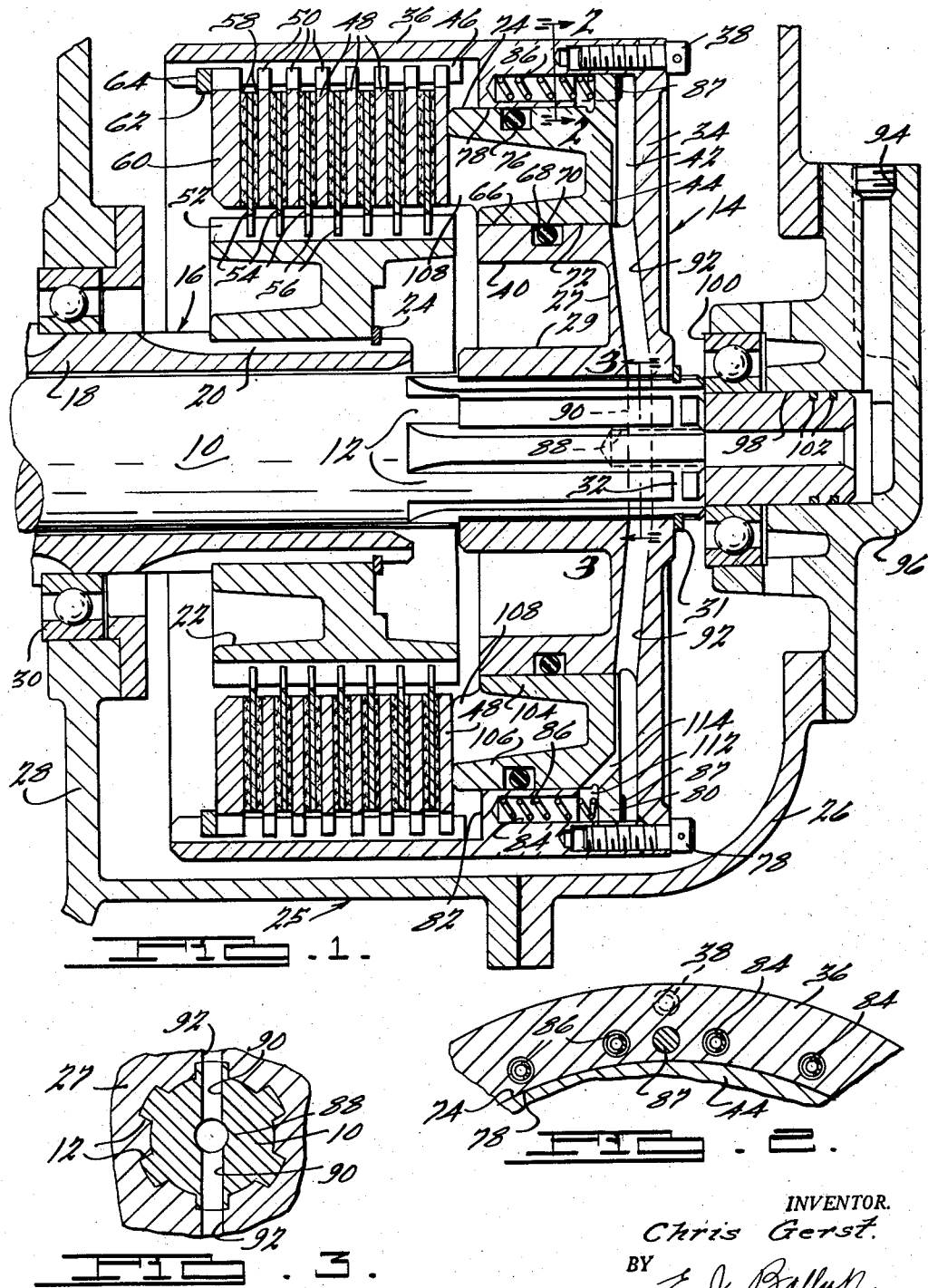

2,880,834

HYDRAULICALLY ACTUATED MULTIPLE DISC CLUTCH

Chris Gerst, Detroit, Mich., assignor to The Transmission & Gear Company, Dearborn, Mich., a corporation of Michigan Application August 23, 1955, Serial No. 530,025

3 Claims. (Cl. 192—85)

This invention relates to clutches and has particular reference to a new and improved hydraulically actuated multiple disc friction clutch.

It is an object of the invention to provide a new and improved hydraulically actuated multiple disc clutch.

Another object of the invention is to provide a hydraulically actuated clutch of improved design.

A further object of the invention is to provide an improved hydraulically operated actuating means for a multiple disc clutch.

Another object of the invention is to provide an improved pressure fluid supply arrangement for a hydraulically actuated clutch.

Other and further objects of the invention will be apparent from the following description and claims and may be understood by reference to the accompanying drawing, which by way of illustration shows a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a sectional view of my improved clutch;

Fig. 2 is a fragmentary sectional view on line 2—2 of Fig. 1; and

Fig. 3 is a fragmentary sectional view on line 3—3 of Fig. 1.

In the illustrated embodiment of the invention, the clutch is mounted on a drive shaft 10 which may be driven from a suitable source of power and a driven element may be driven from shaft 10 through the clutch. The shaft 10 is provided on its outer end with splines 12, and the driving element of the clutch indicated at 14 is splined onto the end of drive shaft 10 for rotation therewith. The driven element of the clutch is indicated at 16 and may comprise a tubular shaft 18 surrounding the drive shaft 10 and having splines 20 on its outer end. A clutch disc carrier 22 is splined onto the end of tubular shaft 18 and engages a split ring 24 which retains the carrier 22 in position on the end of shaft 18. The clutch structure is located within a suitable housing 25 which includes an end plate 26 and a wall 28 receiving a bearing 30 which rotatably supports driven shaft 18 adjacent its outer end. The tubular shaft 18 would, of course, be journaled in a suitable bearing at its other end, which is not shown, so that the driven element 16 of the clutch is freely rotatably supported relative to drive shaft 10.

The driving element 14 comprises a part 27 having a sleeve 29 provided with internal splines receiving the splines 12 formed on the end of shaft 10. A snap ring 31 located within a groove 32 formed on shaft 10 retains the part 27 against axial displacement on shaft 10. The part 27 includes a radially extending wall 34 and a cylindrical cup 36 is rigidly secured thereto by a series of bolts 38. The part 27 includes an annular axially extending wall 40 so as to define, together with the radial wall 34 and the clutch cup 36, an annular cylinder 42 adapted to receive an annular piston 44.

The clutch cup 36 is provided with internal splines or teeth 46 and a series of annular pressure plates 48 have teeth 50 formed on their outer edges for nonrotatably and axially slidably supporting the pressure plates 48 within the clutch cup 36. The driven part 22 is provided with external splines 52 adapted to receive a series of annular clutch discs 54 which are nonrotatably but axially slidably keyed to driven part 22 by internal teeth 56 formed on the clutch discs. The discs 54 have friction linings 58 secured on both sides thereof, and the discs are interposed between successive pressure plates 48. A backing plate 60 is keyed onto clutch cup 36 and restrained from axial movement by a snap ring 62 located within a groove 64 formed on cup 36.

The bearing surface 66 formed on the annular wall 40 is provided with a groove 68 and an O-ring 70 located within groove 68 forms a seal between the inner periphery 72 of piston 44 and cylinder wall or bearing surface 66. The outer periphery 74 of the annular piston 44 is provided with a groove adapted to receive an O-ring 76 forming a seal between piston 44 and the bearing surface 78 formed on clutch cup 36. The piston 44 is slidable axially toward and away from the friction clutch members and includes a radial flange 80 disposed opposite the inwardly projecting rib 82 on which the bearing surface or cylinder wall 78 is formed. The rib 82 is provided with a series of holes 84 opposite flange 80 and springs 86 located within holes 84 react against flange 80 formed on piston 44 and against the clutch cup 36 so as to urge the piston away from the friction clutch elements. The rib 82 may be provided with one or more dowel pins 87 projecting therefrom and received within apertures in the flange 80 so as to prevent rotation of piston 44 relative to its cylinder 42.

The cylinder 42 is supplied with fluid under pressure in the space behind piston 44 to effect engagement of the clutch. An axial bore 88 is formed in the outer end of shaft 10, and bore 88 communicates with radial passages 90 which terminate at their ends at the top of one of the splines 12 formed on shaft 10. The driven part 27 is provided with a pair of radial passages 92, each terminating within one of the splines formed on sleeve 29 and communicating with a transverse passage 90 formed in shaft 10. Pressure fluid is supplied to passage 88 from a passage 94 formed in end cap 96. End cap 96 has a bore 98 in which the end of shaft 10 is journaled by means of bearing 100, and one or more piston rings 102 provide a seal between end cap 96 and shaft 10. Pressure fluid is supplied to passage 94 through a suitable valve assembly, not shown, and through passages 88, 90 and 92 into the cylinder 42 to urge piston 44 against the adjacent pressure plate 48 to urge the pressure plates and clutch discs 54, which are free to slide axially on the driving and driven elements, respectively, into tight frictional engagement so as to drive the driven element 16 from driving element 14. When the hydraulic pressure is released, springs 86 will retract piston 44 to release the pressure between plates 48 and discs 54 to effect disengagement of the clutch.

The annular piston 44 includes an inner axially extending annular wall 104 and an outer axially extending annular wall 106. A series of equally spaced ribs 108 extend between the inner and outer walls 104 and 106. Any suitable number of ribs 108 may be provided, for example, eight, and such ribs contact the adjacent pressure plate 48 substantially throughout its radial extent so as to uniformly apply pressure to the plate throughout its area to insure uniform and positive clutching action. Application of pressure to pressure plates 48 and clutch discs 54 will be in a true axial direction throughout their areas, which will prevent cocking or binding of the clutch members. It will be noted that the use of an annular piston results in a relatively large area for the pressure fluid to react against so that a very great force is available for effecting engagement of the clutch.

The flange 80 formed on the annular piston 44 and the annular rib 82 forming a part of the cylinder 42 cooperates to define therebetween an annular dash pot chamber 112 for controlling or modifying the rate of travel of the piston so as to control the rate of engagement of the clutch. The flange 80 has a rather close fit with the cylinder wall and the fluid within the expansible chamber 112 can escape therefrom through a series of passages 114 which connect the dash pot chamber 112 with the space behind the piston 44 which is supplied with pressure fluid. By properly selecting the size of the restricted passages 114, the rate of engagement of the clutch can be controlled so as to insure a uniform and cushioned clutching action.

While I have illustrated and described a preferred embodiment of my invention, it is understood that this is capable of modification, and I therefore do not wish to be limited to the precise details set forth but desire to avail myself of such changes and alterations as fall within the purview of the following claims:

I claim:

1. A hydraulically actuated friction clutch comprising a driving clutch element, a driven clutch element, a series of axially engageable friction clutch members carried by said clutch elements and adapted for frictional engagement to effect engagement of the clutch, said driving clutch element having an annular cylinder formed therein, an annular piston slidable axially in said cylinder and adapted upon actuation thereof to effect frictional engagement of said clutch members, means for supplying pressure fluid to said cylinder to actuate said piston in one direction and thereby effect said engagement of said clutch members, spring means disposed around the outer periphery of said piston and reacting on said cylinder and piston for urging said piston in the opposite direction to release said frictional engagement, said piston having a radially extending flange at its outer periphery and said driving clutch element having a radially disposed wall opposed to said flange to define therewith an annular dashpot chamber separated from said cylinder by said flange and disposed around the outer periphery of said piston, and restricted passage means connecting said chamber and said cylinder for controlling the escape of pressure fluid from said chamber into said cylinder for controlling the rate of engagement of said clutch.

2. Clutch structure according to claim 1 wherein said spring means react on and between said radially disposed wall and said flange on said piston.

3. A friction clutch according to claim 1, wherein said spring means comprise a series of coil springs carried by said cylinder adjacent and within the outer periphery thereof and wholly within the confines thereof.

References Cited in the file of this patent

UNITED STATES PATENTS

| | | |
|---|---|---|
| 290,517 | Blessing | Dec. 18, 1883 |
| 2,002,367 | Fahrney | May 21, 1935 |
| 2,279,019 | Black | Apr. 7, 1942 |
| 2,328,090 | Nutt et al. | Aug. 31, 1943 |
| 2,328,091 | Nutt et al. | Aug. 31, 1943 |
| 2,386,220 | Lawler et al. | Oct. 9, 1945 |
| 2,437,670 | Adamson | Mar. 16, 1948 |
| 2,505,450 | Wemp | Apr. 25, 1950 |
| 2,511,520 | Walton | June 13, 1950 |
| 2,583,556 | Fleischel | Jan. 29, 1952 |
| 2,721,639 | Miller | Oct. 25, 1955 |
| 2,729,319 | Friedman | Jan. 3, 1956 |
| 2,795,309 | Hasbany | June 11, 1957 |
| 2,823,777 | Banker | Feb. 18, 1958 |

FOREIGN PATENTS

| | | |
|---|---|---|
| 896,942 | France | May 8, 1944 |
| 654,453 | Great Britain | June 20, 1951 |
| 288,528 | Switzerland | May 16, 1953 |